(12) United States Patent
Schlicht

(10) Patent No.: US 7,681,929 B1
(45) Date of Patent: Mar. 23, 2010

(54) PIPE COUPLER FOR METAL TO PLASTIC PIPE

(76) Inventor: Gunter Schlicht, 2726 Shelter Island Dr., #232, San Diego, CA (US) 92106

( * ) Notice: Subject to any disclaimer, the term of this patent is extended or adjusted under 35 U.S.C. 154(b) by 0 days.

(21) Appl. No.: 12/315,142

(22) Filed: Nov. 26, 2008

(51) Int. Cl.
*F16L 21/00* (2006.01)
(52) U.S. Cl. .................... 285/404; 285/348; 285/400
(58) Field of Classification Search ............. 285/342, 285/343, 348, 404, 421, 400, 403
See application file for complete search history.

(56) References Cited

U.S. PATENT DOCUMENTS

| | | | |
|---|---|---|---|
| 1,146,670 A * | 7/1915 | Tippett | 285/337 |
| 3,333,872 A * | 8/1967 | Crawford, Sr. et al. | 285/374 |
| 3,794,363 A | 2/1974 | Schulz | |
| 3,885,818 A * | 5/1975 | Ammann | 285/31 |
| 3,941,410 A * | 3/1976 | Miyaoka | 285/321 |
| 4,458,924 A | 7/1984 | Schlicht | |
| 4,647,083 A * | 3/1987 | Hashimoto | 285/321 |
| 4,725,082 A * | 2/1988 | Burkett | 285/348 |
| 5,071,175 A * | 12/1991 | Kennedy, Jr. | 285/337 |
| 5,413,389 A | 5/1995 | Schlicht | |
| 5,868,438 A | 2/1999 | Svetlik | |
| 6,276,727 B1 | 8/2001 | Schlicht | |
| 6,918,618 B2 * | 7/2005 | Allouche | 285/404 |
| 6,983,960 B2 | 1/2006 | Svetlik | |
| 7,185,924 B1 * | 3/2007 | Longacre et al. | 285/404 |
| 7,484,775 B2 * | 2/2009 | Kennedy, Jr. | 285/337 |

OTHER PUBLICATIONS

American Ductile Iron Pipe, MJ Coupled Joint, http://www.acipco.com/adip/pipe/restrained/mj.cfm (circa 2007).
Star Pipe Products, "Flange Adapters, Series 400," product flier 2007.

* cited by examiner

*Primary Examiner*—David E Bochna
(74) *Attorney, Agent, or Firm*—Richard Esty Peterson

(57) ABSTRACT

A pipe coupler for coupling pipe of dissimilar composition having a substantially cylindrical housing with a stub end and a bell end, the housing having a primarily plastic composition with an embedded anchor ring at the bell end wherein the anchor ring includes a plurality of threaded radial holes and a set of gripping bolts with ends that physically engage an outer surface of a pipe inserted into the bell end of the housing and a plurality of threaded axial holes off-set from the radial holes with a compressor ring, sized to slip over the end of a pipe inserted into the bell end of the housing, the compressor ring compressing a seal when a series of axial bolts engaging the anchor ring are tightened.

15 Claims, 2 Drawing Sheets

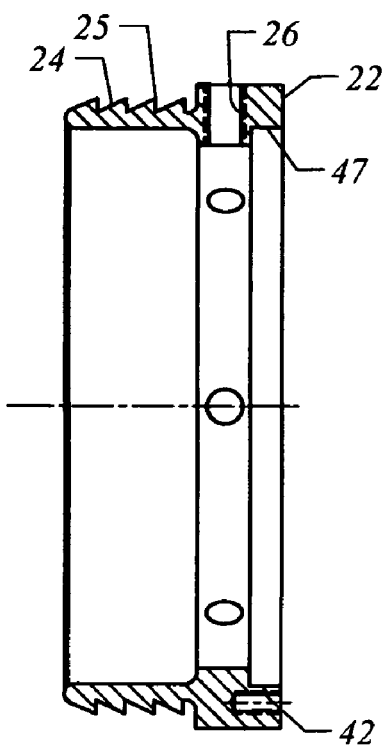
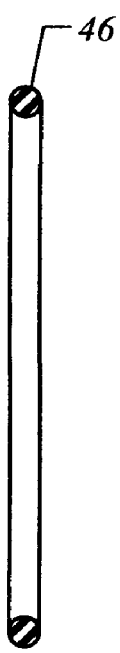
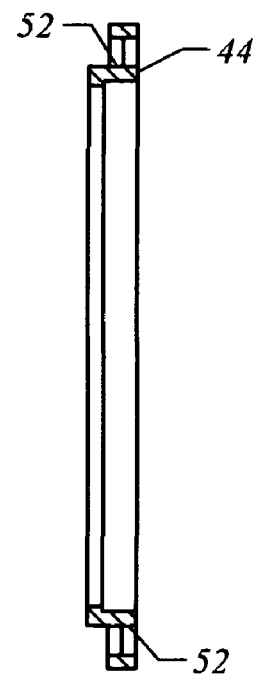
FIG. 3  FIG. 4  FIG. 5
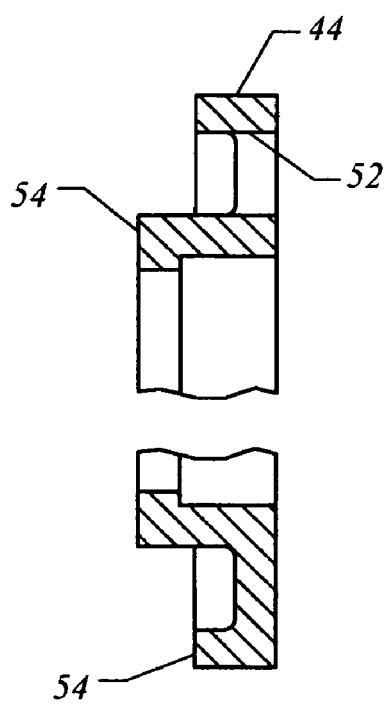
FIG. 6
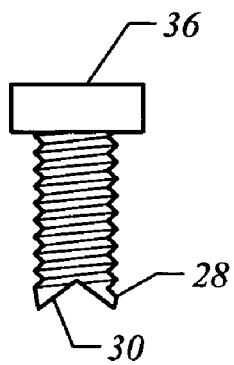
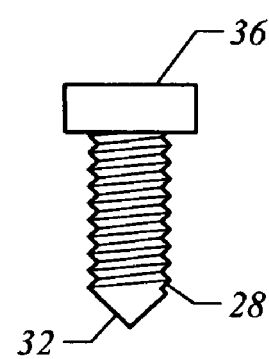
FIG. 7A  FIG. 7B

PIPE COUPLER FOR METAL TO PLASTIC PIPE

BACKGROUND OF THE INVENTION

This invention relates to pipe couplings and in particular to a pipe coupler that interconnects pipe of dissimilar material composition. The pipe coupler of this invention is primarily designed to couple a metal pipe to a plastic pipe using a mechanical means to engage and retain the metal pipe to a largely plastic assembly housing. The pipe coupler is suitable for coupling high density thermoplastic pipe to steel or ductile iron pipe in a waterworks system.

In many industrial and fluid transport networks, there may be a need to transition from a plastic pipe system to a metal pipe system. This need may arise in the field where a quick and easy coupling is desired that can be installed without specialty equipment or capabilities. It is expected that the pipe coupler of this invention be designed to service a piping network that provides for the transport of a variety of liquids and fluidized solids at a range of pressures and flows. While primarily designed for use in waterworks systems, the invented pipe coupler will have use in a variety of applications where pipes of dissimilar composition are to be joined.

In coupling pipe, the axial forces that tend to separate connected pipe sections at the joint become considerable as the diameter of the pipe and the fluid pressure increase. Bonding techniques for interconnecting pipe of dissimilar composition are limited and, frequently, a mechanical clamping system is required to prevent separation. The system of this invention can be employed in a variety of circumstances where a mechanism for clamping is required in a pipe fitting for coupling one pipe segment to another.

SUMMARY OF THE INVENTION

The pipe coupler of this invention is designed to couple pipe where mechanical means is required to connect one pipe segment to another. Typically, mechanical assistance is required where pipe systems of dissimilar material are desired to be connected and conventional bonding techniques, using thermal fusion or chemical cementing are inadequate. It is common in waterworks systems to couple high density polyethylene pipe to steel or ductile iron pipe. The metal/plastic transition requires a pipe fitting that is fabricated of a composition compatible with conventional bonding to the plastic pipe and outfitted with an apparatus that provides mechanically assisted connection to the metal pipe.

The pipe coupler of this invention comprises a pipe fitting that has a hybrid metal/plastic housing unit that is part of a housing assembly with accessory components enabling mechanical clamping of the housing unit at one end to one pipe segment, and conventional bonding at the other end to the other pipe segment. Ordinarily, the mechanical clamping clamps the housing unit to a segment of metal pipe.

The metal/plastic transition connection in the preferred embodiment allows flow in either direction with a joint that has a negligible friction drop and allows for a laminar flow. The pipe coupler has a housing assembly with a largely plastic housing and a mechanical connection mechanism fused into the housing that engages the metal pipe in a mechanical grip. The joint between the metal pipe and the primarily plastic coupler is sealed with an O-ring that is compressed by a metal compressor ring that connects to the connection mechanism that is embedded in the plastic housing. Preferably, the compressor ring has a convoluted structure of the type disclosed in my U.S. Pat. No. 5,413,389, entitled, "Convoluted Piping Flange," issued May 9, 1995.

BRIEF DESCRIPTION OF THE DRAWINGS

FIG. 3 is a cross-sectional view of an anchor ring in the pipe coupler of FIG. 1 with off-set at the centerline to show the off-set radial and axial holes.

FIG. 4 is a cross-sectional view of an O-ring that installs against the anchor ring of FIG. 3.

FIG. 5 is a cross-sectional view of a compression ring that presses the O-ring of FIG. 4 against the anchor ring of FIG. 3.

FIG. 6 is an enlarged fragmented cross-sectional view of the compression ring of FIG. 5.

FIG. 7A is a side elevational view of a specialty bolt.

FIG. 7B is a side elevational view of an alternate embodiment of a specialty bolt.

DETAILED DESCRIPTION OF THE PREFERRED EMBODIMENTS

Figure 1:
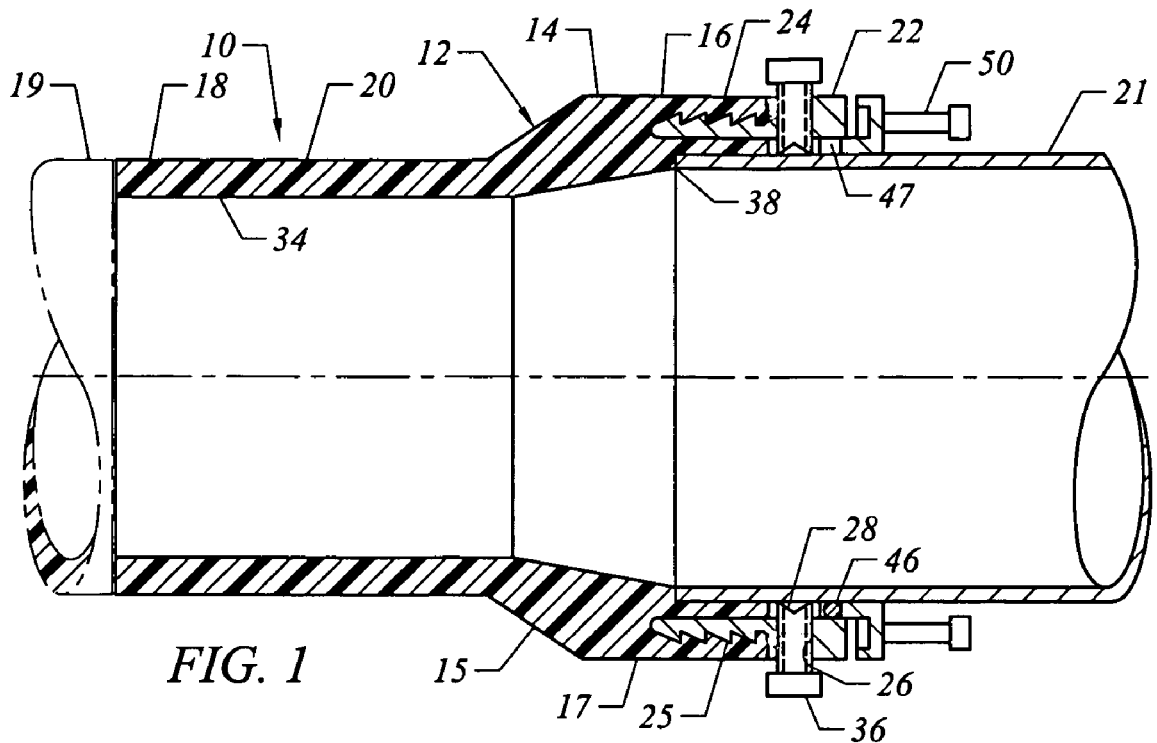
FIG. 1 is a cross sectional view of the pipe coupler of this convention connected to a metal pipe and to a plastic pipe.
Figure 2:
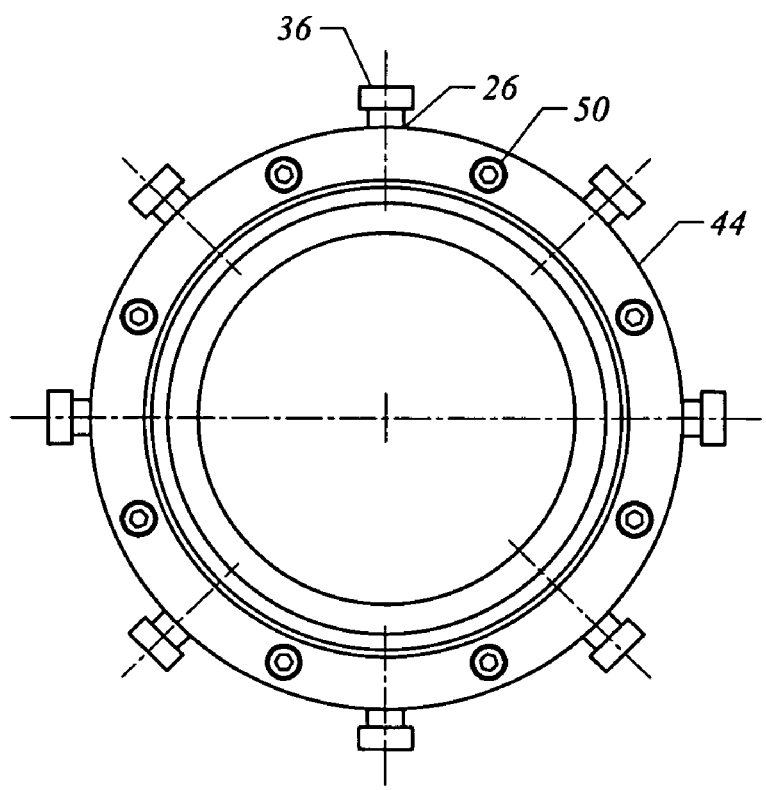
FIG. 2 is an end view of the pipe coupler of FIG. 1.

The pipe coupler of this invention, designated generally by the reference numeral 10 is primarily designed to couple plastic pipe to metal pipe. Typically, a high density thermoplastic polymer, such as HDL, is used in many current piping systems because of savings in installation and maintenance costs. Modern plastics can be selected for a variety of different applications and tailored to the composition of the fluids being conveyed and the pressures and flows of operation. To interconnect a plastic pipe network with a metal pipe network, an occurrence frequently encountered in system upgrades, the coupling preferably must include a mechanical means to engage and hold the metal pipe to the coupler.

In the preferred embodiment of the pipe coupler 10 shown in FIG. 1, the coupler fitting 12 has a hollow housing assembly 14 that includes a housing unit 15 formed with a plastic molded housing 16, having a bell end 17 and a stub end 18. The stub end 18 is sized to the outside diameter (O.D.) of a coupled plastic pipe 19 (shown in phantom) and has a plastic neck 20 that may be adapted to connect to a standard plastic fitting; such as a reducer coupling, elbow, tee or other fitting as desired. For thermoplastic pipe, the stub-end butts directly to a length of pipe 19 and connects by thermal fusion, as shown in FIG. 1. The bell end 17 is flared to a diameter sufficient to adequately accommodate the O.D. of a metal pipe 21 and includes an anchor ring 22, shown in FIG. 3, that has an anchor cuff 24 embedded in the bell end 16 during thermocasting of the plastic housing 16, as shown in the cross sectional view of FIG. 1. The anchor cuff 24 has a series of saw-tooth circumferential ridges 25 to ensure that the anchor ring 22 will not dislodge from the plastic housing 16 during use.

The metal pipe 21, which has an O.D. sized to the cylindrical opening or I.D. of the anchor ring 22, is inserted into the bell end 17 of the housing unit 15 through the circular opening in the fused anchor ring 22.

The anchor ring 22 has eight radial bolt holes 26, uniformly spaced around the perimeter of the anchor ring 22. Threadably engaged in the bolt holes 26 are clamping bolts 36, which have a special end 28 that is designed to gouge the surface of the pipe 21 to which the fitting 12 is attached. In FIG. 1, the pipe 21 is steel and the end 28 of the bolts 36 may have alternate cutting edges 30, 32 formed by machining as shown in the side views of FIGS. 7A and 7B.

In the preferred embodiment, the plastic housing 16 has an interior with an eleven degree transformation from the cylindrical section 34 of the stub end 18 to the pipe stop 38 at the bell end 17. This gradual transition wall allows for laminar flow for fluid flow through the fitting. As illustrated, the pipe 21 inserts into the housing unit 15 until the end of the pipe 21 abuts the pipe stop 38. The clamping bolts 36 are then uniformly tightened to mechanically connect the metal pipe 21 to the housing assembly 14.

In addition to the radial holes 26, the anchor ring 22 has a series of eight off-set threaded axial holes 42 spaced around the end of the anchor ring 22 for connection of the housing unit 15 to a compressor ring 44, shown in FIG. 5, for sealing.

A cup screw 50 with a hex socket is inserted through each of the eight axial holes 52 around the compressor ring 44 and engages a corresponding threaded hole 42 in the anchor ring 22. A protruding circumferential inner rim or foot 54 on the compressor ring 44 contacts an O-ring 46, shown in FIG. 4, and presses the O-ring 46 into a groove 47 formed between the anchor ring 22 and the metal pipe 21. On lightly tightening the cup screws 50, the O-ring 46 seats between the coupler 10 and the pipe 21. The convoluted structure of the compressor ring 44, as shown in FIG. 6, is designed to substantially lighten the weight of the ring 44 without sacrificing structural integrity. When the O-ring is compressed, the joint between the pipe coupler 10 and the metal pipe 40 is sealed. The clamping bolts 36 are preferably coated with a sealant such as "Gripp Lite" by Hercules. This insures that there will be no leakage out through the bolt threads.

As noted, the anchor ring 22 is embedded into the plastic housing 15 when the housing is molded. The O-ring, compressor ring, clamping bolts 36 and cup screws 50, when installed on the housing unit 15, complete the housing assembly 14. Typically, the metal anchor ring 22 and compressor ring 44 are steel or ductile iron, but may be brass, aluminum or in special instances a composition material that can be drilled and threaded with adequate integrity. Similarly, while the pipe coupler 10 is intended to couple a metal pipe system, such as steel or stainless steel, to a thermo-plastic pipe system, the pipe coupler 10 may be used to couple dissimilar plastic pipe together, particularly where the plastic compositions of the coupled pipe may not be compatible for thermal or cement bonding.

During installation, the bolts 36 engaging the metal pipe should be tightened uniformly, preferably with a torque wrench according to specifications provided for the various sizes of fittings and the material of the pipe to which the fitting is connected. This insures that neither the metal pipe nor the metal anchor ring are unduly deformed by overtightening. Uniform torquing provide for maximum frictional engagement with minimum stress on the components. The housing assembly 14 is preferably pre-assembled with the clamping bolts 36 retracted into the anchor ring 22 and the cup screws 50 loosened to entrap, but not compress, the O-ring 46. The entire assembly can then be slipped over the metal pipe, taking care not to dislodge the O-ring, and adjusted until the end of the pipe contacts the pipe stop 38. The clamping bolts 36 should then be prepared with liquid seal and tightened to orient the anchor ring 22. This insures the foot of the convoluted compressor ring 44 properly positions the O-ring in the groove defined by the metal pipe and the end of the anchor ring. Final tightening of the clamping bolts and cup screws seals the joint and provides a rigid connection for attachment of thermoplastic pipe to metal pipe.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. A pipe coupler for coupling pipe of dissimilar composition comprising:
   a housing unit having a housing assembly wherein the housing assembly includes:
   a substantially cylindrical housing having a stub end and a bell end with a hollow passage from the stub end to the bell end, the housing having a primarily plastic composition with an embedded anchor ring at the bell end wherein the anchor ring includes a plurality of threaded radial holes and a plurality of threaded axial holes off-set from the radial holes;
   a set of gripping bolts having ends adapted to physically engage an outer surface of a pipe inserted into the bell end of the housing;
   a sealing ring, sized to encompass the outer surface of a pipe inserted into the bell end of the housing;
   a compressor ring, sized to slip over the end of a pipe inserted into the bell end of the housing, the compressor ring having a plurality of axial holes allignable with the axial threaded holes of the anchor ring, and;
   a set of connection screws that connect the compressor ring to the anchor ring with the sealing ring positioned between the compressor ring and the anchor ring.

2. The pipe coupler of claim 1 wherein the anchoring ring has a cuff with ridges wherein the cuff embeds into the plastic composition of the housing and anchors the anchor ring to the housing.

3. The pipe coupler of claim 1 wherein the anchor ring has a metal composition.

4. The pipe coupler of claim 1 wherein the hollow passage from the stub end to the bell end has a gradual transition that promotes laminar flow.

5. The pipe coupler of claim 1 wherein the sealing ring comprises an O-ring.

6. The pipe coupler of claim 1 wherein the compressor ring is a convoluted flange for high strength and light weight.

7. The pipe coupler of claim 1 wherein the anchor ring has an inner groove at the end of the housing for seating the sealing ring when a pipe is inserted into the bell end of the housing.

8. The pipe coupler of claim 7 wherein the compressor ring has the configuration of a convoluted flange with a projecting rim that engages the sealing ring in the inner groove of the anchor ring to compress the sealing ring against the anchor ring and a pipe inserted into the bell end of the housing.

9. The pipe coupler of claim 1 wherein the gripping bolts are treated with a sealant before engaging a pipe inserted into the bell end of the housing.

10. The pipe coupler of claim 1 wherein the stub end of the housing of the housing unit is adapted for coupling to one of a pipe and a pipe fitting.

11. The pipe coupler of claim 1 wherein the stub end of the housing of the housing unit is adapted for coupling to one of a pipe and a pipe fitting.

12. A pipe coupler for coupling pipe of dissimilar composition comprising:
   a housing unit having a housing assembly wherein the housing assembly includes:
   a substantially cylindrical housing having a stub end and a bell end with a hollow passage from the stub end to the bell end, the housing having a primarily plastic composition with an embedded anchor ring at the bell end having a metal composition wherein the anchor ring includes a plurality of threaded radial holes; and wherein the bell end and anchor ring have an opening sized to accommodate the outside diameter of a metal pipe when the pipe is inserted into the opening of the bell end and anchor rings:

A set of gripping bolts threaded in the threaded radial holes, the gripping bolts having ends adapted to physically engage an outer surface of the metal pipe when the pipe is inserted through the opening of the anchor ring and the bell end of the housing; and a seal in the bell end of the housing, sized to encompass the outer surface of a pipe inserted into the bell end of the housing.

13. The pipe coupler of claim 12 wherein the anchoring ring has a cuff with ridges wherein the cuff embeds into the plastic composition of the housing and anchors the anchor ring to the housing.

14. The pipe coupler of claim 12 wherein the hollow passage from the stub end to the bell end has a gradual transition that promotes laminar flow.

15. The pipe coupler of claim 12 wherein the seal is an O-ring seal.

* * * * *